(12) United States Patent
Kimbara et al.

(10) Patent No.: US 7,112,239 B2
(45) Date of Patent: Sep. 26, 2006

(54) GAS STORAGE APPARATUS

(75) Inventors: Masahiko Kimbara, Okazaki (JP); Daigoro Mori, Mishima (JP); Takehiro Nito, Toyota (JP); Hidehito Kubo, Kariya (JP); Keiji Toh, Kariya (JP)

(73) Assignees: Toyota Jidosha Kabushiki Kaisha, Toyota (JP); Kabushiki Kaisha Toyota Jidoshokki, Kariya (JP)

( * ) Notice: Subject to any disclaimer, the term of this patent is extended or adjusted under 35 U.S.C. 154(b) by 101 days.

(21) Appl. No.: 10/848,055

(22) Filed: May 19, 2004

(65) Prior Publication Data
US 2005/0000234 A1 Jan. 6, 2005

(30) Foreign Application Priority Data
May 20, 2003 (JP) .............. 2003-141559

(51) Int. Cl.
F17C 11/00 (2006.01)
(52) U.S. Cl. .............. 96/108; 206/7
(58) Field of Classification Search .......... 96/108, 96/146; 206/7; 423/248, 648.1; 502/526; 62/46.2; 165/61, 181
See application file for complete search history.

(56) References Cited

U.S. PATENT DOCUMENTS

| | | | | |
|---|---|---|---|---|
| 4,165,569 A | * | 8/1979 | Mackay | 34/416 |
| 4,187,092 A | * | 2/1980 | Woolley | 62/46.2 |
| 4,457,136 A | * | 7/1984 | Nishizaki et al. | 62/46.2 |
| 4,819,718 A | * | 4/1989 | Ishikawa et al. | 165/104.12 |
| 4,859,427 A | * | 8/1989 | Konishi et al. | 422/159 |
| 4,928,496 A | * | 5/1990 | Wallace et al. | 62/46.2 |
| 4,964,524 A | * | 10/1990 | Halene | 220/586 |
| 5,445,099 A | * | 8/1995 | Rendina | 114/140 |
| 6,432,379 B1 | * | 8/2002 | Heung | 423/648.1 |
| 6,638,348 B1 | * | 10/2003 | Kuriiwa et al. | 96/146 |
| 6,709,497 B1 | * | 3/2004 | Myasnikov et al. | 96/126 |
| 2002/0020299 A1 | * | 2/2002 | Iwamoto et al. | 96/146 |

FOREIGN PATENT DOCUMENTS

JP 2000-120996 A * 4/2000
JP A 2002-161999 6/2002

* cited by examiner

*Primary Examiner*—Frank M. Lawrence
(74) *Attorney, Agent, or Firm*—Oliff & Berridge, PLC

(57) ABSTRACT

A hydrogen storage apparatus that includes multiple gas storage tanks that each house a storing/adsorbing material and through the interior of which a fluid travels is provided. The gas storage apparatus 10 includes roughly cylindrical gas storage tanks 20 that house hydrogen-storing alloy. The multiple gas storage tanks 20 are disposed longitudinally parallel to each other in an ordered fashion such that roughly triangular prism-shaped empty spaces are formed between multiple adjacent hydrogen storage tanks 20. Coolant paths through which coolant flows are formed in these roughly triangular prism-shaped empty spaces. These coolant paths are thermally connected to the hydrogen-storing alloy in the gas storage tanks 20 via constituent members of the gas storage tanks 20 and via heat transfer plates 28 disposed on the gas storage tanks 20.

17 Claims, 11 Drawing Sheets

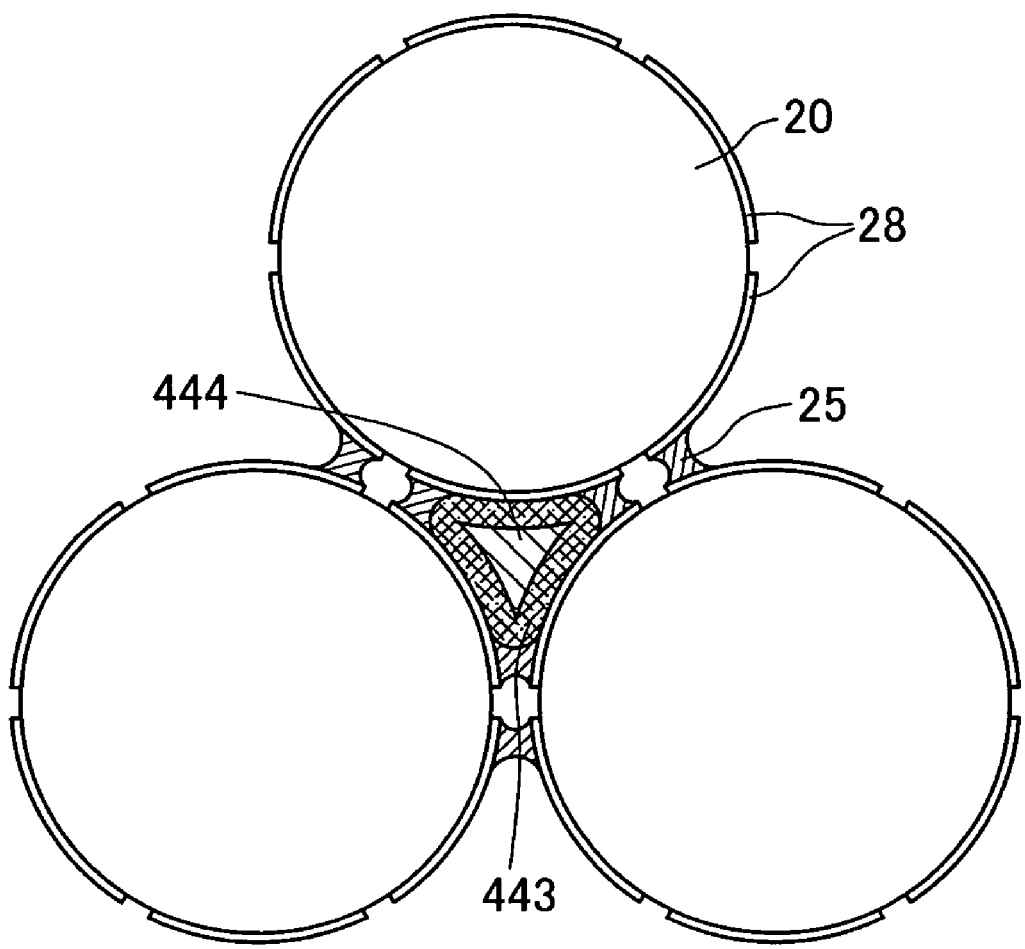

GAS STORAGE APPARATUS

BACKGROUND OF THE INVENTION

1. Field of the Invention

The present invention relates to a gas storage apparatus that includes gas tanks for storage of gas.

2. Description of the Related Art

Various types of gas tanks for storage of gas have been proposed. One known method for storing gas involves the occlusion or adsorption of gas in a prescribed storing/adsorbing material. For example, a hydrogen storage tank that stores hydrogen gas using a hydrogen-storing material stored inside the tank is known. In addition, a hydrogen storage tank is known wherein a heat transfer medium channel is disposed on the outer circumference of the tank and a thermal conduction material that transfers heat between the heat transfer medium inside the heat transfer medium channel and the hydrogen-storing material is disposed inside the tank.

In a gas storage apparatus equipped with a gas storage tank, the number of gas storage tanks may be increased in order to increase gas storage capacity. When the number of gas storage tanks is increased, thereby realizing a gas storage apparatus incorporating multiple gas storage tanks, there is a risk that the arrangement of the pipes used to circulate the coolant or other fluid will become complex. However, sufficient attention has not been paid to the specific design of the arrangement of the pipes used to circulate coolant or other fluid in a gas storage apparatus incorporating multiple gas storage tanks.

SUMMARY OF THE INVENTION

The present invention was created in view of this problem with the conventional art, and an object thereof is to improve heat exchange efficiency when a coolant is used in a gas storage apparatus that incorporates multiple gas storage tanks that contain a storing/adsorbing material.

In order to achieve the above object, a first aspect of the present invention provides a gas storage apparatus for the storage of gas. The gas storage apparatus pertaining to this first aspect includes multiple roughly cylindrical gas storage tanks that are disposed in an ordered fashion such that roughly triangular-prism shaped empty spaces are formed between parallel adjacent tanks, and roughly triangular prism-shaped coolant path units through which coolant flows, such coolant path units disposed in such empty spaces such that they come into contact with the gas storage tanks along the outer surfaces thereof.

According to the first gas storage apparatus of the present invention having the construction described above, because coolant path units in which coolant flows are disposed in roughly triangular prism-shaped empty spaces formed between multiple gas storage tanks arranged in an ordered fashion in contact with the outer surfaces of the gas storage tanks, the heat exchange efficiency of a gas storage apparatus equipped with multiple gas storage tanks can be improved when coolant is used. Furthermore, because the multiple gas storage tanks are arranged in an ordered fashion such that they are parallel to each other and roughly triangular prism-shaped empty spaces are formed between adjacent gas storage tanks, the gas storage apparatus can be made more compact in size. In other words, the amount of gas stored using a prescribed empty space can be increased. If the multiple gas storage tanks are arranged in an ordered three-dimensional fashion such that roughly triangular prism-shaped empty spaces are formed between three adjacent gas storage tanks, a larger number of gas storage tanks can be housed in the gas storage apparatus in a compact fashion. Consequently, because coolant paths are formed using the spaces formed between the gas storage tanks while housing multiple roughly cylindrical gas storage tanks in a compact fashion, the overall size of the gas storage apparatus is not increased by the incorporation of coolant paths.

In the gas storage apparatus pertaining to the first aspect of the present invention, the gas storage tanks may house a storing/adsorbing material that stores and/or adsorbs the gas. In this case, an larger amount of hydrogen can be stored in the gas storage tanks.

In the gas storage apparatus pertaining to the first aspect of the present invention, because the coolant flows inside coolant path units disposed outside the gas storage tanks, the arrangement of the coolant paths can be made simpler than if the coolant paths were disposed inside the gas storage tanks. For example, even where high-pressure gas is stored inside the gas storage tanks, a special coolant path arrangement is not required in order to ensure the reliability of the apparatus under such high pressure.

In the gas storage apparatus pertaining to the first aspect of the present invention, the coolant path units may each include three metal heat transfer plates that form the three side surfaces of each coolant path unit and cover part of the outer walls of the gas storage tanks, and buffer members are formed from an elastic material and are disposed between adjacent heat transfer plates.

Under such a construction, heat can be easily transferred between the coolant path units and the gas storage tanks by forming the side wall surfaces of the triangular prism-shaped coolant path units from metal heat transfer plates that partially cover the outer walls of the gas storage tanks. Furthermore, by placing buffer members between adjacent heat transfer plates, when the individual gas storage tanks expand or contract due to the gas storing/adsorbing action of the storing/adsorbing material, this expansion or contraction can be absorbed by the buffer members. This enables the overall durability of the gas storage apparatus to be improved.

In the gas storage apparatus pertaining to the first aspect of the present invention, the entire interior of each said coolant path unit that is surrounded by the three heat transfer plates may form a coolant path in which coolant flows. With such a construction, a coolant path can be easily formed by ensuring that a seal exists between the heat transfer plates or other members that form the coolant path units.

In the gas storage apparatus pertaining to the first aspect of the present invention, a flow constrictor that reduces the cross-sectional area of the coolant path may be disposed in the interior of each coolant path unit. With such a construction, coolant flow can be speeded up by reducing the cross-sectional area of the coolant path, thereby improving the efficiency of heat exchange between the coolant and the walls of the coolant path.

The flow constrictor may include a rod-shaped main unit that runs parallel to the coolant path unit and one or more gripping members that are formed from an elastic material and are disposed such that they come to contact with the main unit and the interior walls of the coolant path unit.

With such a construction, the incorporation of one or more gripping members formed from an elastic material enable the rod-shaped main unit to be stably supported inside the coolant path unit even where the gas storage apparatus shakes or vibrates.

The flow constrictor may include protrusions formed on the outer surface of each heat transfer plate that forms an interior wall of said coolant path unit. With such a construction, heat transfer between the coolant and the heat transfer plates can be accelerated by the presence of protrusions on the heat transfer plates. Therefore, heat exchange efficiency when coolant is used can be further improved. It is preferred that the protrusions, like the gripping members, be formed from an elastic material such as rubber.

It is acceptable if the protrusions are configured such that the surfaces of the heat transfer plates obstruct the flow of coolant. With such a construction, because the laminar flow of the coolant flowing in the coolant path unit is disrupted, resulting in agitation of the coolant, heat exchange efficiency is further increased.

In the gas storage apparatus pertaining to the first aspect of the present invention, it is acceptable if the apparatus further includes outer wall heat transfer acceleration units that fill the gaps formed between the outer walls of the gas storage tanks and the heat transfer plates and accelerate heat transfer between the gas storage tank outer walls and the heat transfer plates. With such a construction, heat transfer between the coolant path units and the gas storage tanks is further improved. These outer wall heat transfer acceleration units may be formed from a gel-like substance. This allows them to be easily disposed in the gaps formed between the outer walls of the gas storage tanks and the heat transfer plates.

In the gas storage apparatus pertaining to the first aspect of the present invention, coolant pipes in which coolant flows may be disposed inside each coolant path unit such that they are in contact with the heat transfer plates. With such a construction, because placing coolant pipes inside the coolant path unit reduces the cross-sectional area of the coolant path in which the coolant flows, the speed of coolant flow is increased, thereby improving the efficiency of heat exchange between the coolant and the walls of the coolant pipes in which the coolant flows. Here, because the coolant pipes are in contact with the heat transfer plates, highly efficient heat exchange takes place between the coolant in the coolant pipes and the gas storage tanks covered by the heat transfer plates.

In the gas storage apparatus pertaining to the first aspect of the present invention, the coolant pipes disposed in each coolant path unit may each be U-shaped and include two substantially linear sections that run longitudinally parallel to the heat transfer plates and a curved section disposed at a specified longitudinal end thereof.

With such a construction, by forming the coolant pipes in a U-shape in which the curved section is formed at a specified end of the heat transfer plates, the entire mechanism to supply and discharge the coolant to the coolant pipes can be disposed on the same side as the specified ends. Therefore, the arrangement of the pipes by which the coolant is supplied to and discharged from the coolant pipes can be simplified. Such simplification enables the gas storage apparatus to be assembled more easily.

A second aspect of the present invention provides a gas storage apparatus for the storage of gas. The gas storage apparatus of the second aspect of the present invention includes multiple roughly cylindrical gas storage tanks that contain a storing/adsorbing material that stores and/or adsorbs gas and roughly triangular prism-shaped coolant paths through which coolant flows that are formed between the parallel gas storage tanks.

According to the gas storage apparatus pertaining to the second aspect of the present invention having the above construction, because coolant flows in roughly triangular prism-shaped coolant paths formed between multiple parallel gas storage tanks, heat exchange efficiency is improved when coolant is used in a gas storage apparatus that incorporates multiple gas storage tanks. Furthermore, because the gas storage tanks are arranged parallel to each other such that roughly triangular prism-shaped coolant paths are formed therebetween, the gas storage apparatus can be further reduced in size. In other words, the amount of gas stored using a prescribed empty space can be increased. Consequently, because coolant paths are formed between gas storage tanks while multiple roughly cylindrical gas storage tanks are housed in a compact fashion, the overall size of the gas storage apparatus is not increased by the incorporation of coolant paths. Moreover, because the coolant flows in coolant paths disposed outside the gas storage tanks, the arrangement of the coolant paths can be made simpler than if the coolant paths were formed inside the gas storage tanks.

A third aspect of the present invention provides a gas storage apparatus for the storage of gas. The gas storage apparatus of the third aspect of the present invention includes multiple roughly cylindrical gas storage tanks that each contain a storing/adsorbing material that stores and/or adsorbs gas and are disposed in an ordered fashion such that they are parallel to each other, as well as multiple U-shaped coolant pipes that each include two substantially linear sections that run longitudinally parallel to the gas storage tanks and a curved section disposed at a specified end thereof.

According to the gas storage apparatus pertaining to the third aspect of the present invention having the above construction, because multiple U-shaped coolant pipes that each include two substantially linear sections that run longitudinally parallel to the gas storage tanks and a curved section disposed at a specified end thereof are disposed such that they come into contact with the surfaces of the gas storage tanks, heat transfer between the coolant and the gas storage tanks is ensured in the straight sections, and heat exchange efficiency when coolant is used in a gas storage apparatus that incorporates multiple gas storage tanks is increased. Furthermore, because the multiple roughly cylindrical gas storage tanks are disposed parallel to each other in an ordered fashion, the gas storage apparatus can be reduced in size. In other words, the amount of gas stored using a prescribed empty space can be increased. Here, because multiple coolant pipes are disposed in the empty spaces formed between the gas storage tanks arranged in an ordered fashion, the overall size of the gas storage apparatus is not increased by the incorporation of coolant pipes. Moreover, because the coolant flows in coolant pipes disposed outside the gas storage tanks, the arrangement of the coolant paths can be made simpler than if the coolant paths were formed inside the gas storage tanks.

In the gas storage apparatus pertaining to any of the first through third aspects of the present invention, it is acceptable if the gas storage tanks are tanks that store hydrogen gas, each tank comprising a container that is formed from metal containing aluminum and houses the storing/adsorbing material, and the storing/adsorbing material includes a hydrogen storing alloy.

An aluminum (aluminum alloy) container offers superior performance as a container for housing a storing/adsorbing material that stores hydrogen gas without permitting leakage of hydrogen molecules to the outside when the hydrogen gas is stored at high pressure. Furthermore, because aluminum is light and offers superior heat conductivity, a sufficiently high level of heat conductivity between the storing/adsorbing material and the coolant can be ensured by disposing the container formed from metal that includes aluminum between the two.

The present invention may be realized in various aspects other than those described above, and may be realized as a manufacturing method for a gas storage apparatus, for example.

BRIEF DESCRIPTION OF THE DRAWINGS

FIG. 10 is an explanatory drawing showing a variation of the barrier rod 44 of the second embodiment;

DESCRIPTION OF THE PREFERRED EMBODIMENTS

The hydrogen storage apparatus pertaining to the present invention is described below with reference to the drawings based on several embodiments.

A. CONSTRUCTION OF HYDROGEN STORAGE APPARATUS

Figure 1:
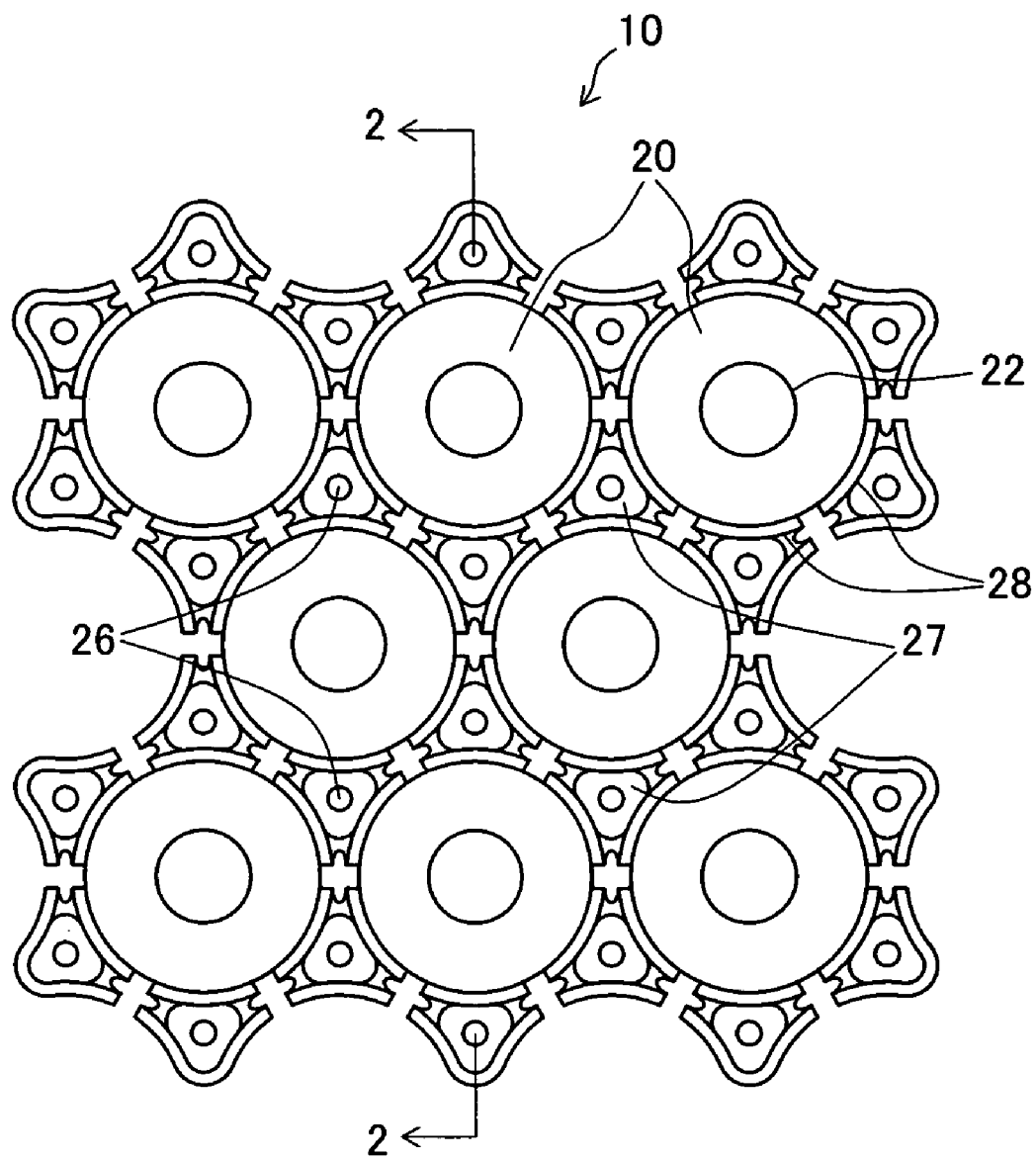
FIG. 1 is an explanatory drawing showing the basic construction of a hydrogen storage apparatus 10.
Figure 2:
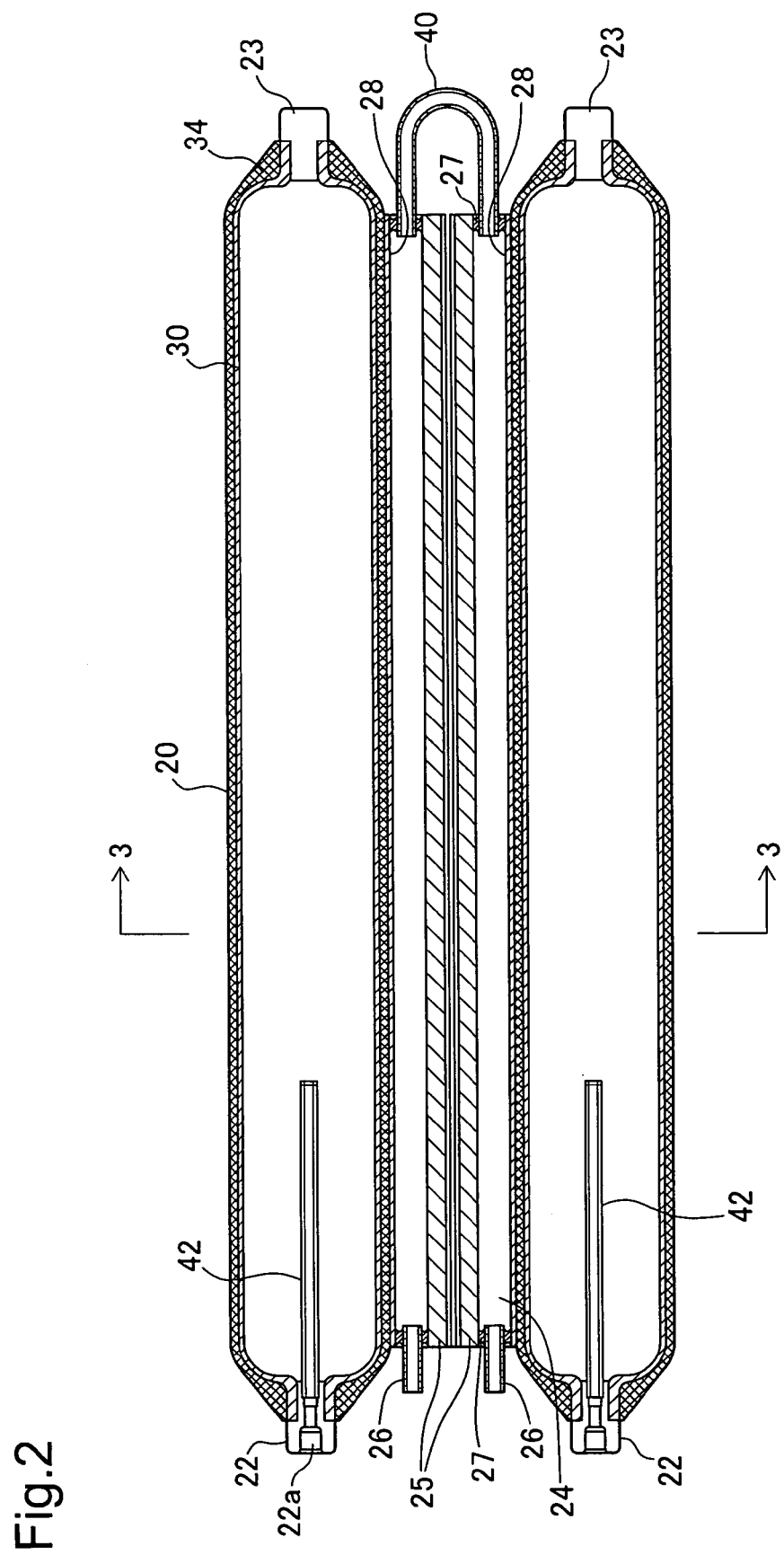
FIG. 2 is an explanatory drawing showing a cross-sectional view of FIG. 1 cut across the line 2—2 therein.

FIG. 1 is an explanatory drawing showing the basic construction of a hydrogen storage apparatus 10 comprising a first embodiment of the present invention, and FIG. 2 is an explanatory cross-sectional drawing showing the important elements of such apparatus, obtained by cutting along the line 2—2 in FIG. 1. The hydrogen storage apparatus 10 is constructed by assembling multiple roughly cylindrical hydrogen storage tanks 20. In this hydrogen storage apparatus 10, the multiple hydrogen storage tanks 20 are arranged three-dimensionally in an ordered fashion such that they are parallel to each other in the longitudinal (axial) direction and such that a roughly triangular prism-shaped empty space is formed between each group of three adjacent hydrogen storage tanks 20 (see FIG. 1). Coolant paths 24 through which coolant flows are formed in these roughly triangular prism-shaped empty spaces formed between the hydrogen storage tanks 20 (see FIG. 2).

Each hydrogen storage tank 20 includes a tank container 30 that serves as an outer wall for the hydrogen storage tank 20 and comprises a roughly cylindrical empty container that is filled on the inside with hydrogen-storing alloy powder. In this embodiment, the tank container 30 is made of aluminum alloy. Openings that are smaller than the horizontal cross-sectional area of the tank container 30 are formed at either end thereof. A connector 22 is mounted at one opening of the tank container 30, and a connector 23 is mounted at the other opening (see FIG. 2). These connectors 22 and 23 ensure the air tightness of the tank container 30 at their respective openings, thereby preventing the hydrogen gas stored inside the tank container 30 from escaping. In addition, a hydrogen supply/discharge opening 22a that opens to the outside to allow hydrogen gas to be supplied to or removed from the tank container 30 is disposed in the connector 22.

Furthermore, a narrow and roughly cylindrical filter 42 that is connected to the hydrogen supply/discharge opening 22a is disposed inside the hydrogen storage tank 20 such that it resides in the center of the hydrogen storage tank 20 and runs longitudinally parallel thereto (see FIG. 2). The filter 42 is made from sintered metal, for example, and comprises a gas-permeable porous body that effectively prevents the hydrogen-storing alloy powder that fills the tank container 30 from entering the filter 42. By protecting the hydrogen supply/discharge opening 22a via the filter 42, the hydrogen-storing alloy power is retained inside the tank container 30. Moreover, when hydrogen is stored into the hydrogen-storing alloy inside the tank container 30, or when hydrogen is extracted from the hydrogen-storing alloy, the filter 42 serves as a passageway for the hydrogen.

A reinforcing layer 34 is formed on the outer wall of the tank container 30 (see FIG. 2). This reinforcing layer 34 increases the strength of the tank container 30 in which the high-pressure hydrogen gas is stored, and is made of carbon fiber-reinforced plastic (CFRP), for example. The reinforcing layer 34 is formed by wrapping carbon fiber that has been impregnated with epoxy resin, for example, around the outer wall of the tank container 30 and hardening the impregnated resin.

Figure 3:
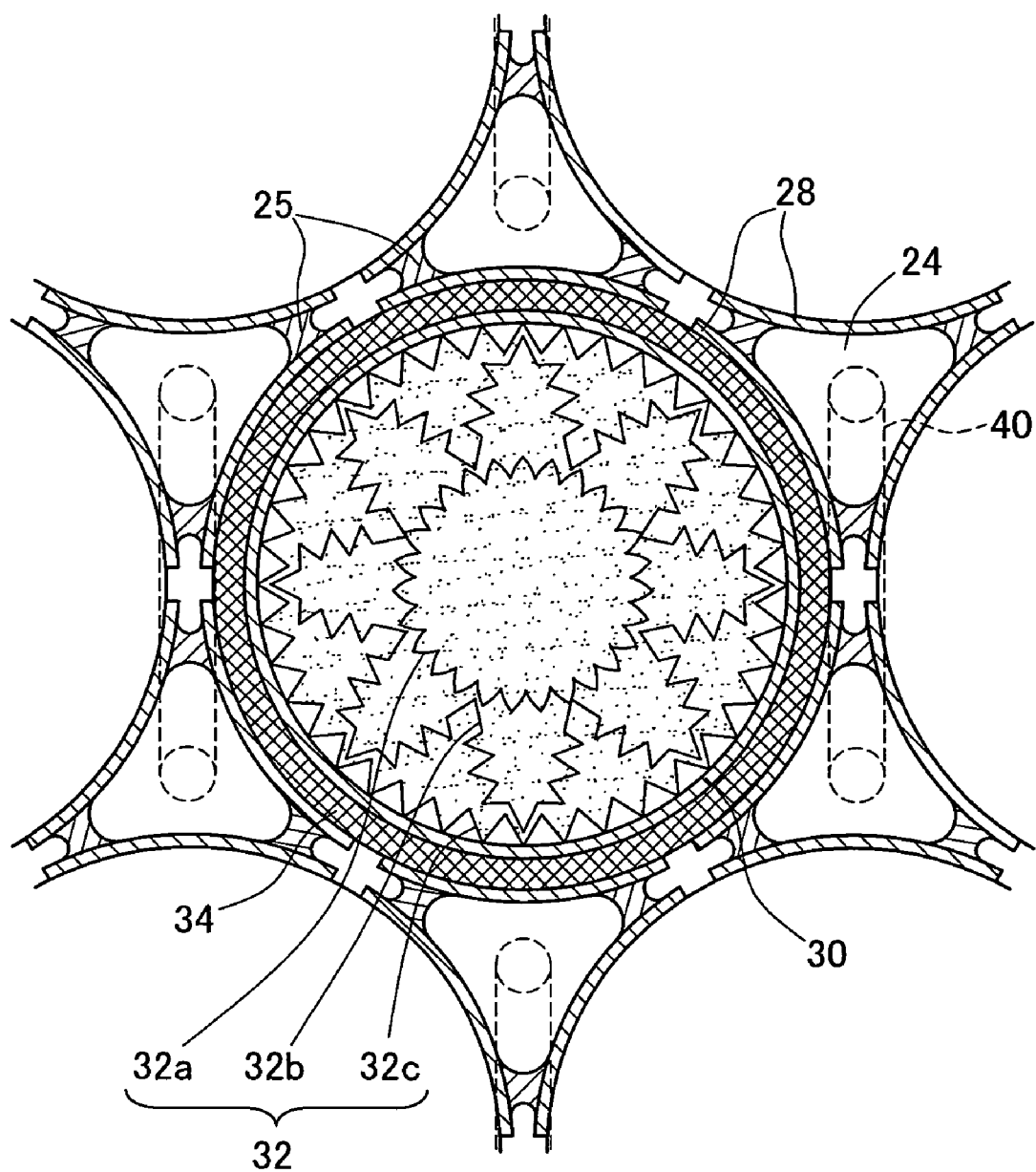
FIG. 3 is an explanatory drawing showing a cross-sectional view of FIG. 2 cut across the line 3—3 therein.

FIG. 3 is an explanatory drawing showing a cross-sectional view of an individual hydrogen storage tank 20 and the periphery thereof, obtained by cutting along the line 3—3 in FIG. 2. A fin 32 is disposed inside the tank container 30, and the space partitioned inside the tank container 30 by the fin 32 is filled with hydrogen-storing alloy powder. The fin 32 of this embodiment has a three-layer construction. In other words, the fin 32 includes an inner fin 32a disposed such that it surrounds the center of the tank container 30 over the length thereof, an outer fin 32c disposed along the inner side surface of the tank container 30, and a connecting fin 32b disposed between the inner fin 32a and the outer fin 32c and in contact with both. Each of these three fins comprises a thin plate having the folded cross-sectional configuration shown in FIG. 3 and extending longitudinally within the interior of the tank container 30. The surface of the fin 32 is in contact with the hydrogen-storing alloy, and is in thermal contact with the wall of the tank container 30 due to the assembly of the three fins described above. As a result, heat is transferred between the hydrogen-storing alloy that fills the tank container 30 and the tank container 30 itself via the fin 32. Therefore, the fin 32 is constructed so as to accelerate heat transfer between the hydrogen-storing alloy and the tank container 30, and any other configuration thereof is acceptable so long as the same effect is obtained. In FIG. 2, there is no representation of the fin 32 or of the hydrogen-storing alloy that fills the tank container 30.

The outer wall of the hydrogen storage tank 20, i.e., the outer circumferential side surface of the reinforcing layer 34, is covered by multiple heat transfer plates 28. Each heat transfer plate 28 comprises a longitudinally extended plate member having a length approximately equal to that of the hydrogen storage tank 20, and is curved so as to follow the surface contour of the hydrogen storage tank 20. Six heat transfer plates 28 are disposed around the outer peripheral surface of each hydrogen storage tank 20 so as to cover the entire longitudinal side surface thereof. Each transfer plate 28 comprises a metal material providing sufficient heat conductivity and strength, such as aluminum alloy or stainless steel.

As described above, because the hydrogen storage tanks 20 are disposed such that a roughly triangular prism-shaped empty space is formed between each group of three adjacent hydrogen storage tanks 20, six of these triangular prism-shaped empty spaces are formed around each hydrogen storage tank 20 (see FIGS. 1, 3). Here, each of the six heat transfer plates 28 disposed over the various hydrogen storage tanks 20 comprises a side of one of the six empty spaces. As a result, each roughly triangular prism-shaped empty space is surrounded by three heat transfer plates 28, each formed so as to curve around the outer wall of a roughly cylindrical hydrogen storage tank 20.

Figure 4:
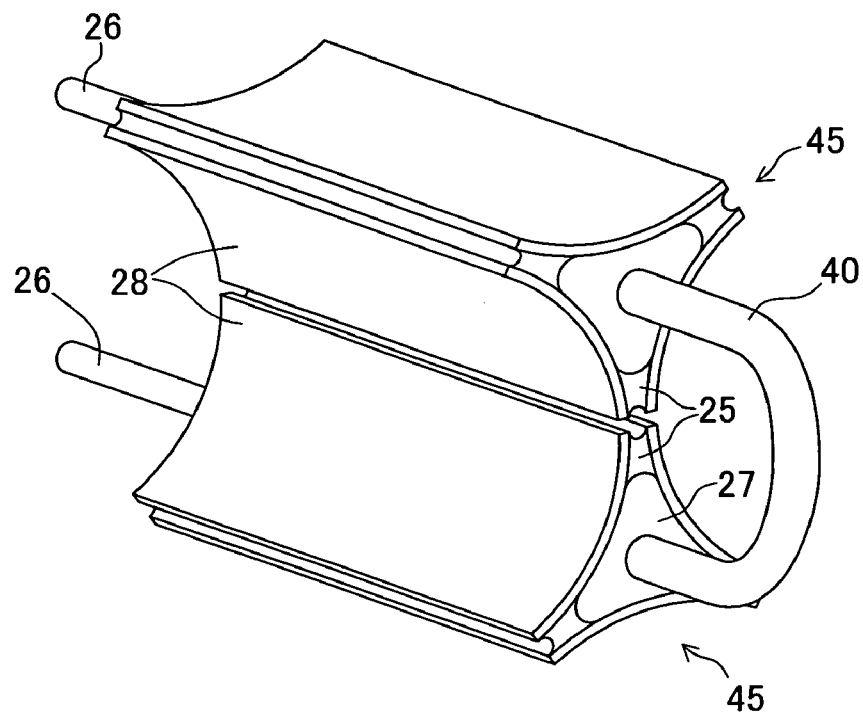
FIG. 4 is an explanatory drawing showing the connection of a pair of roughly triangular prism-shaped empty spaces via a U-shaped pipe 40.

A cap 27 comprising an elastic material such as rubber is disposed at either longitudinal end of each roughly triangular prism-shaped empty space described above. In addition, a seal member 25 is disposed between adjacent heat transfer plates at each edge of each roughly triangular prism-shaped empty space. In other words, a seal member 25 extends along the longitudinal direction of the heat transfer plates 28 in each area at which [adjacent] heat transfer plates 28 that form a roughly triangular-prism shaped empty space come into contact with each other, including the areas at which the heat transfer plates 28 come into contact with the caps 27 (see FIGS. 2 and 3). This seal member 25 also comprises an elastic material, and may be formed by applying an adhesive such as synthetic rubber between the heat transfer plates 28, for example. The sealed-off state of each triangular prism-shaped empty space is ensured by these seal members 25. In this embodiment, the entire empty space that is sealed off in this fashion forms a coolant path 24 through the interior of which a prescribed coolant flows. In the description below, the entire structure comprising a roughly triangular prism-shaped coolant path 24, three heat transfer plates 28, seal members 25 and caps 27 is termed a coolant path unit 45. FIG. 4 is a perspective view showing the elements of two adjacent coolant path units 45.

A connecting pipe 26 that passes through the cap 27 disposed at the same end of the coolant path unit 45 as the end at which the connector 22 is mounted to the hydrogen storage tank 20, and connects the interior of the empty space and the space outside the hydrogen storage tank 20, is fixed to such cap 27 (see FIGS. 2 and 4). One end of a U-shaped pipe 40 is fixed to the cap 27 at the other end of the coolant path unit 45, and the fixing of this U-shaped pipe 40 allows two adjacent coolant paths 24 to be connected to each other. FIG. 4 shows two coolant path units 45 connected by a U-shaped pipe. The positions of the U-shaped pipes 40 in a horizontal cross-sectional view of the hydrogen storage apparatus 10 are shown using dashed lines in FIG. 3. In the hydrogen storage apparatus 10, when coolant is supplied to a coolant path unit 45 from the outside via the connecting pipe 26, the supplied coolant reaches the end at which the U-shaped pipe 40 is disposed after it passes through the coolant path 24 formed inside the coolant path unit 45. The direction of coolant flow is then reversed by the U-shaped pipe 40, whereupon the coolant is guided into and passes through the coolant path 24 formed by the adjacent coolant path unit 45 and is discharged from the connecting pipe 26 fixed to such adjacent coolant path unit 45.

The hydrogen storage apparatus 10 is assembled by combining the structure comprising two coolant path units 45 and a U-shaped pipe 40 as shown in FIG. 4 with hydrogen storage tanks 20 in an ordered three-dimensional fashion to create the configuration shown in FIG. 1. When this is done, it is preferred that outer wall heat transfer acceleration units that accelerate heat transfer between the heat transfer plates 28 and the hydrogen storage tanks 20 be formed in the gaps therebetween. In this embodiment, these outer wall heat transfer acceleration units are formed by applying a heat conducting gel to the surfaces of the heat transfer plates 28 before the coolant path units 45 and the hydrogen storage tanks 20 are assembled together. This heat conducting gel is a gelatinized high-polymer material having a relatively high thermal conductivity, such as silicone (Alphagel from Geltec Co., Ltd., for example). The outer wall heat transfer acceleration unit need not be formed using gel, and may have a sheet or other configuration so long as it effectively plugs such gap by having, like gel, a certain level of fluidity and viscosity. So long as the material that is applied to the gaps between the heat transfer plates 28 and hydrogen storage tanks 20 to form the outer wall heat transfer acceleration units that accelerate heat transfer between the outer wall of each hydrogen storage tank 20 and the heat transfer plates 28 has a heat transfer rate higher than that of air, such as heat conducting gel, a certain level of effectiveness will be obtained, but it is preferred that a material having an even higher heat transfer rate be selected. Furthermore, even where heat conducting gel is used, because such gel normally has a lower thermal conductivity than metal such as aluminum alloy, it is preferred that the gaps between the heat transfer plates 28 and the hydrogen storage tanks 20 be made as small as possible.

When assembling the hydrogen storage tanks 20 and the coolant path units 45, the hydrogen storage tanks 20 and coolant path units 45 need not be assembled in sequence, and the coolant path units 45 may first be set in prescribed positions. The hydrogen storage tanks 20 may then be placed in the empty spaces formed between the coolant path units 45. For example, a desired number of structures formed by connecting two coolant path units 45 via a U-shaped pipe 40, as shown in FIG. 4, may be assembled. The coolant path units 45 may then be assembled into a prescribed three-dimensional configuration while the connecting pipes 26 that belong to each of the coolant path units 45 are connected according to a prescribed arrangement. By connecting the connecting pipes 26 according to a prescribed pipe arrangement in this fashion, the multiple coolant path units 45 can be loosely maintained in accordance with a desired positional relationship by this pipe arrangement. Because roughly triangular prism-shaped empty spaces are formed between the coolant path units 45 once they are positioned in the desired configuration, assembly may be carried out by inserting the hydrogen storage tanks 20 into these spaces from the side at which the U-shaped pipes 40 are mounted to the coolant path units 45. Finally, the entire assembly of the hydrogen storage tanks 20 and coolant path units 45 should be secured such that force is continuously applied in the direction perpendicular to the longitudinal direction of the tanks. In this way, a construction may be obtained that can sufficiently absorb the force applied in the direction perpendicular to the longitudinal direction of the tanks when the hydrogen storage tanks 20 expand or contract.

B. HYDROGEN OCCLUSION AND DISCHARGE OPERATION

When hydrogen is stored in the hydrogen storage apparatus 10, high-pressure hydrogen is introduced into each hydrogen storage tank 20 via the hydrogen supply/discharge opening 22a. The hydrogen introduced from the hydrogen supply/discharge opening 22a passes through the filter 42 and reaches the hydrogen-storing alloy that fills the tank container 30 and is stored by the hydrogen-storing alloy. The amount of hydrogen stored by the hydrogen-storing alloy is determined by the pressure of the supplied hydrogen, the temperature, and the type of hydrogen-storing alloy. When hydrogen is supplied at a prescribed pressure, the hydrogen-storing alloy increases in temperature while storing the hydrogen until a prescribed temperature is reached. Therefore, when hydrogen is stored, coolant is supplied to and discharged from the coolant paths 24, thereby cooling the hydrogen storage tanks 20 via the flow of coolant in the coolant paths 24 and promoting the hydrogen occlusion action of the hydrogen-storing alloy. The heat generated by the hydrogen-storing alloy due to the hydrogen occlusion action is absorbed by the tank container 30 and the reinforcing fiber 34, transmitted to the coolant flowing inside the coolant paths 24 via the fin 32, tank container 30, reinforcing fiber 34 and heat transfer plates 28, and finally discharged via the coolant. After the hydrogen-storing alloy rises to a prescribed temperature, hydrogen gas is introduced into the empty spaces formed between the particles of hydrogen-storing alloy powder inside the tank container 30 at a pressure corresponding to the pressure of the hydrogen supplied to the hydrogen storage tank 20 until each hydrogen storage tank 20 is filled with hydrogen.

When hydrogen is drawn from a hydrogen storage tank 20, first, the pressurized hydrogen residing in the empty spaces formed between the particles of hydrogen-storing alloy powder is discharged, whereupon the hydrogen stored by the hydrogen-storing alloy is discharged. Because the hydrogen-storing alloy discharges hydrogen when it absorbs heat, the operation to discharge hydrogen from the hydrogen-storing alloy can be maintained by circulating a prescribed high-temperature coolant in the coolant paths 24 described above and heating the hydrogen-storing alloy. The heat energy stored by the coolant during this hydrogen discharge is transferred to the hydrogen-storing alloy via the heat transfer plates 28, reinforcing fiber 34, tank container 30 and fin 32.

According to the hydrogen storage apparatus 10 of this embodiment having the above construction, because the multiple roughly cylindrical hydrogen storage tanks 20 are disposed roughly parallel to each other and are arranged such that roughly triangular prism-shaped empty spaces are formed therebetween, the overall size of the hydrogen storage apparatus 10 can be reduced. In other words, the amount of gas stored using a prescribed empty space can be increased. Because the coolant paths 24 are created using the empty spaces formed between the hydrogen storage tanks 20, the overall size of the hydrogen storage apparatus 10 is not increased by the creation of the coolant paths.

By disposing the coolant paths 24 outside the hydrogen storage tanks 20, the arrangement of coolant paths can be made simpler than if the coolant paths were disposed inside the hydrogen storage tanks 20. In other words, if the coolant paths were disposed inside the hydrogen storage tanks 20, the coolant path would have to be disposed such that it had sufficient resistance to the pressure inside the tank, but by disposing the coolant paths 24 outside the hydrogen storage tanks 20, there is no need for a special construction to ensure reliability in a high-pressure environment. Furthermore, because the coolant paths 24 formed via the empty spaces described above are connected by U-shaped pipes 40 disposed outside the hydrogen storage tanks 20, the arrangement of the coolant paths and the assembly operation can be simplified.

In this embodiment, because the seal members 25 and caps 27 made of an elastic material are disposed between the heat transfer plates 28 that form the coolant paths 24, the expansion and contraction of the hydrogen storage tanks 20 that occurs during the hydrogen storage and discharge operations can be absorbed by the seal members 25. The overall durability of the hydrogen storage apparatus 10 can be improved by causing the expansion and contraction of the individual storage tanks 20 to be absorbed by the seal members 25 that are disposed between the heat transfer plates 28 and operate as buffer members.

Furthermore, because a fin 32 is disposed in each hydrogen storage tank 20 in this embodiment, heat transfer between the hydrogen-storing alloy and the tank container 30 can be accelerated. As a result, the efficiency of heating and cooling of the hydrogen-storing alloy can be increased and the hydrogen occlusion and discharge operations can be carried out efficiently even though the coolant paths are located outside the hydrogen storage tanks. In particular, in this embodiment, because heat conducting gel that operates as outer wall heat transfer promoting areas is applied to the gaps formed between the heat transfer plates 28 comprising the coolant paths 24 and the hydrogen storage tanks 20, the efficiency of heat transfer between the coolant in each coolant path 24 and hydrogen-storing alloy can be further increased.

C. SECOND EMBODIMENT

Figure 5:
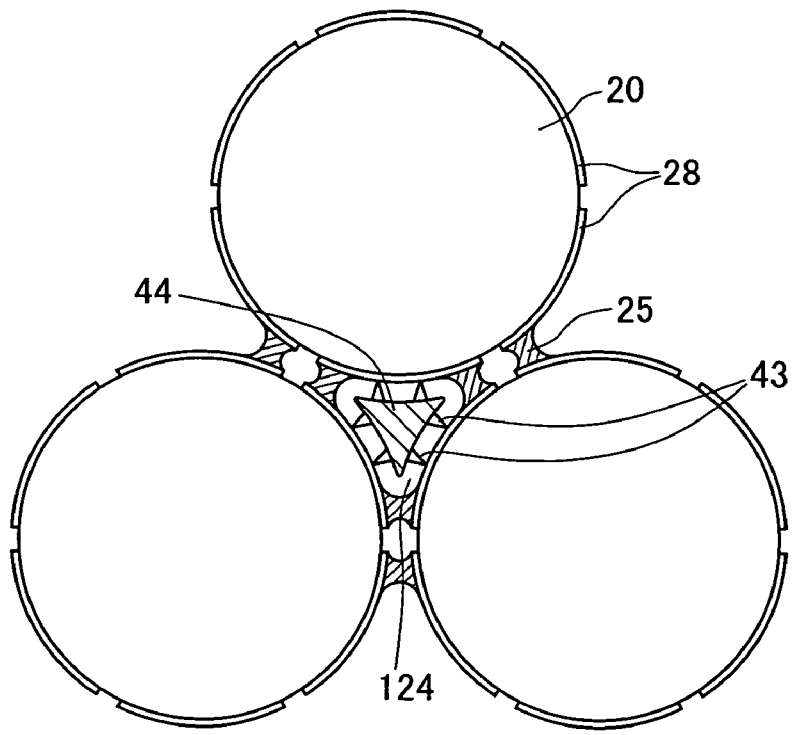
FIG. 5 is an explanatory drawing showing the basic construction of a hydrogen storage apparatus of a second embodiment.

FIG. 5 is an explanatory drawing showing the basic construction of a hydrogen storage apparatus of a second embodiment based on a horizontal cross-section similar to that of FIG. 3. Because the hydrogen storage apparatus of the second embodiment has a construction similar to that of the hydrogen storage apparatus 10 of the first embodiment, identical reference numbers will be used in FIG. 5 to indicate common components with the first embodiment. Furthermore, because the interior construction of the coolant path formed between the hydrogen storage tanks 20 in the hydrogen storage apparatus of the second embodiment differs from the equivalent construction in the first embodiment, FIG. 5 focuses on the construction of such coolant path.

In the hydrogen storage apparatus of the second embodiment, a barrier rod 44 is disposed inside the coolant path 124 formed between three hydrogen storage tanks 20 in the same manner as the coolant path 24 of the first embodiment. This barrier rod 44 includes a roughly triangular prism-shaped main unit and multiple gripping members 43 that protrude from the side surfaces of the main unit. These gripping members 43 support the barrier rod 44 inside the coolant path 124 by gripping the inner surfaces of the coolant path 124, i.e., the surfaces of the heat transfer plates 28. The barrier rod 44 is formed to have a length that is slightly shorter than the entire length of the coolant path 124.

Therefore, the barrier rod 44 does not plug off the ends at which the connecting pipe 26 or the U-shaped pipe 40 is connected, thereby ensuring smooth inflow and outflow of the coolant.

Figure 6:
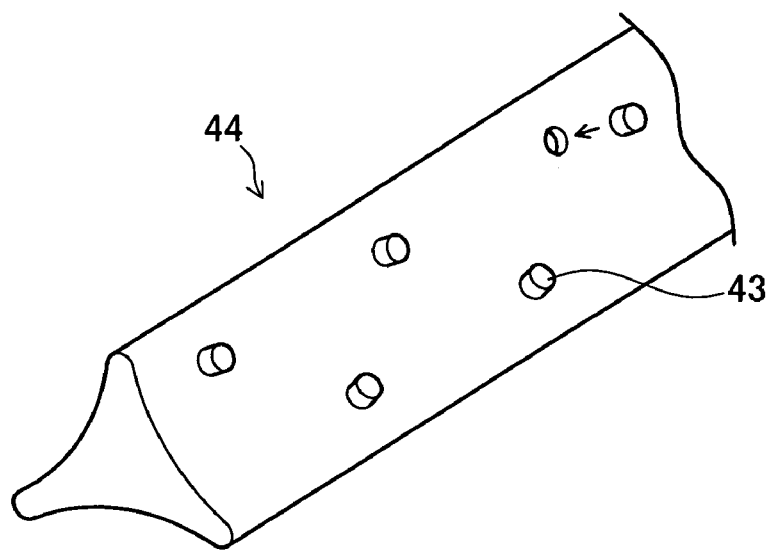
FIG. 6 is a perspective view of the construction of a barrier rod 44.

FIG. 6 is a perspective view showing the construction of the barrier rod 44. The barrier rod 44 includes multiple gripping members 43 comprising protrusions disposed at prescribed intervals on each side of the three side surfaces thereof. The roughly triangular prism-shaped main unit may be made from any material having sufficient strength and heat resistance, such as resin, metal or rubber. Where the main unit is made from metal, it is preferred that it be hollow in order to make the barrier rod 44 as light as possible. In this case, it is acceptable if the side surface areas of the roughly triangular prism-shaped main unit are formed via bending of a thin metal plate and the end sections of the triangular prism are capped or plugged using any of the materials described above. The gripping members 43 are formed using an elastic material such as rubber. By forming the gripping members 43 from an elastic material in this fashion, the barrier rod 44 can be supported inside the coolant path 124 in a stable fashion even where the hydrogen storage apparatus shakes or vibrates. When the gripping members 43 are mounted, mounting holes are formed at the mounting positions on the side surfaces of the main unit, and the members that will constitute the gripping members are embedded and fixed in these holes (see FIG. 6). Alternatively, the gripping members 43 may be glued to the main unit surfaces using an adhesive rather than embedded in holes as described above.

According to the hydrogen storage apparatus pertaining to the second embodiment, because the cross-sectional area of the coolant path 124 Is reduced by the presence of the barrier rod 44, the flow speed of the coolant within the coolant path 124 increases, enabling the efficiency of heat exchange between the coolant and the walls of the coolant path (i.e., the heat transfer plates 28) to be increased. Placing an obstacle to coolant flow inside the coolant path 124 that reduces the flow path cross-sectional area in this fashion enables the cooling operation performed by the coolant during hydrogen occlusion and the coolant heating operation performed during hydrogen discharge to be performed more efficiently. Alternatively, because it is no longer necessary to speed up the flow speed of the coolant supplied to the coolant paths 124 in order to obtain adequate flow speed therein, the construction of the apparatus can be simplified, and the energy efficiency of the entire apparatus may be increased.

Figure 7:
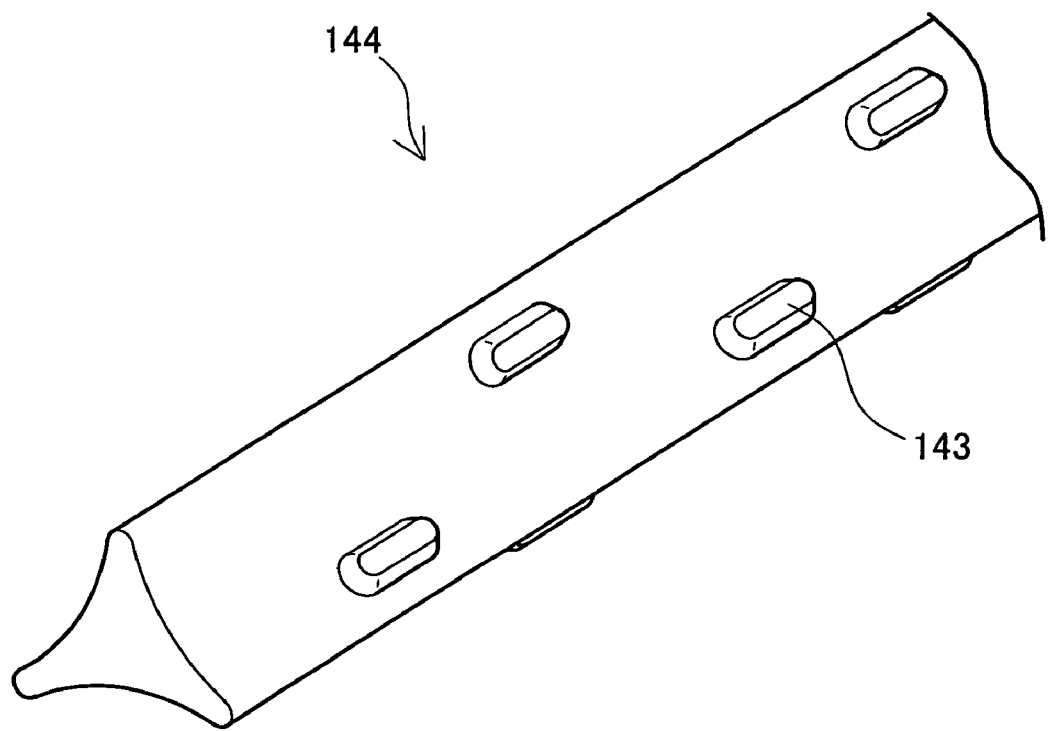
FIG. 7 is an explanatory drawing showing a variation of the barrier rod 44 of the second embodiment.
Figure 8:
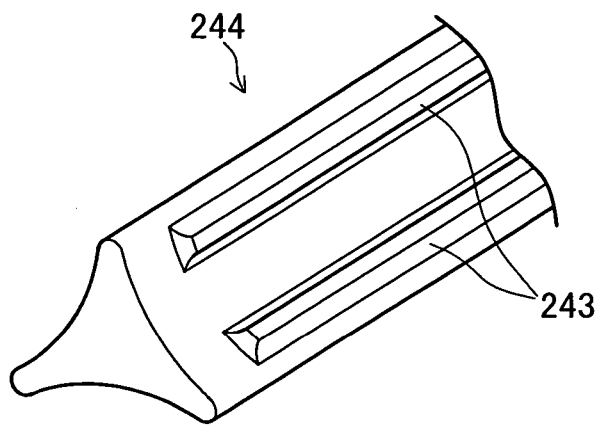
FIG. 8 is an explanatory drawing showing a variation of the barrier rod 44 of the second embodiment.
Figure 9A:
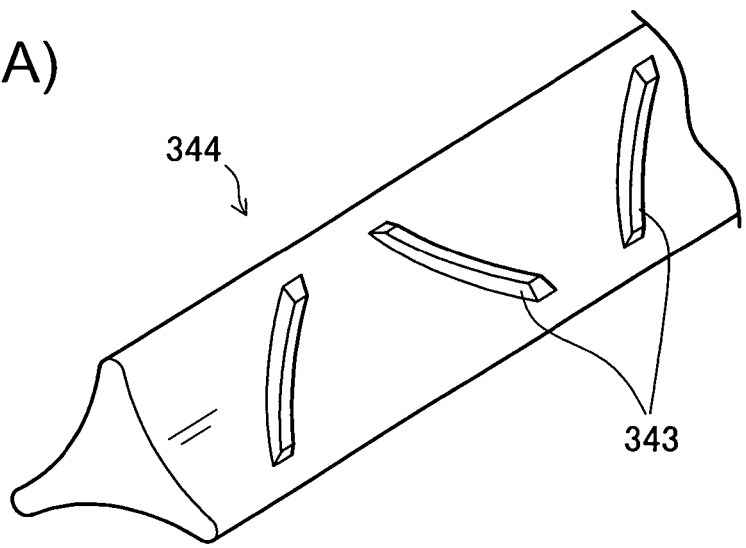
FIG. 9 comprises explanatory drawings showing a variation of the barrier rod 44 of the second embodiment.
Figure 9B:
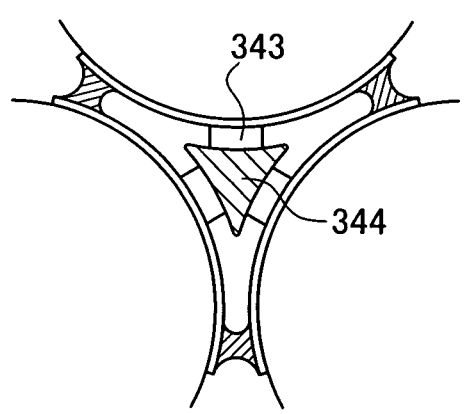

Variations of the barrier rod 44 of the second embodiment are shown in FIGS. 7 through 9. Like the barrier rod 44 of the second embodiment, gripping members having a prescribed configuration are affixed or mounted to a roughly triangular prism-shaped main unit in each variation. The barrier rod 144 shown in FIG. 7 has gripping members 143 that extend longer in the longitudinal direction of the barrier rod 144 than the gripping members 43 of the second embodiment. The barrier rod 244 shown in FIG. 8 has two long parallel gripping members 243 disposed continuously on the side surfaces of the barrier rod 244 in the longitudinal direction thereof. The barrier rod 344 shown in FIG. 9 has multiple gripping members 343 constituting long protrusions oriented in directions opposite the direction of coolant flow within the coolant path on each side surface. FIG. 9(A) is a perspective view showing the construction of the barrier rod 344, while FIG. 9(B) is an explanatory drawing showing a cross-section of a coolant path in which the barrier rod 344 is inserted. The barrier rods of these variations and the gripping members fixed to the side surfaces thereof are made of the same materials described in connection with the second embodiment, and the gripping members may be fixed to the barrier rod using any method by which the gripping members of the second embodiment could be embedded or affixed. Consequently, the same effect as that obtained by the second embodiment may be obtained. Furthermore, gaps may exist between the barrier rod gripping members and the coolant path.

Still another variation in which a barrier rod is disposed inside the coolant path is shown in FIG. 10. FIG. 10 shows a horizontal cross-section of a coolant path, and the barrier rod 444 shown in FIG. 10 is held inside the coolant path formed by the three storage tanks 20 by a metal mesh 443. The metal mesh 443 supports the barrier rod 444 within the coolant path with a prescribed elasticity and enables the coolant to pass therethrough. The member that supports the barrier rod in the coolant path may have any desired configuration so long as such configuration allows the coolant to travel around the barrier rod and enables the barrier rod to be held inside the coolant path with adequate stability.

As in the case of the barrier rod 344 shown in FIG. 9 or the barrier rod 444 supported by the metal mesh 443 in FIG. 10, the effect of disrupting the laminar flow of the coolant and agitating the coolant, thereby increasing heat exchange efficiency, can be obtained depending on the configuration of the member that supports the barrier rod. In the second embodiment and variations thereof described above, the barrier rod that operates as a flow constrictor has a roughly triangular prism configuration, but a rod-shaped member having a non-triangular cross-sectional configuration may be used. So long as placement of the member in the coolant path serves to reduce the cross-sectional area of the coolant path, the same effect obtained via enhanced coolant flow speed [in the second embodiment and the variations thereof] may be achieved.

D. THIRD EMBODIMENT

Figure 11A:
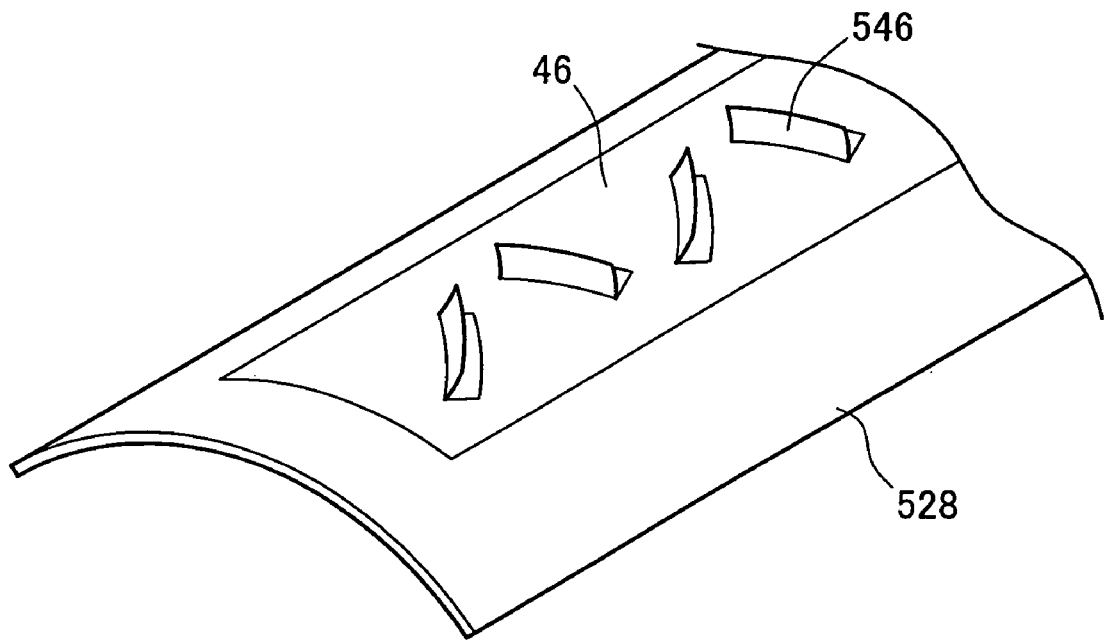
FIG. 11 comprises explanatory drawings showing the construction of a coolant path in a hydrogen storage apparatus of a third embodiment.
Figure 11B:
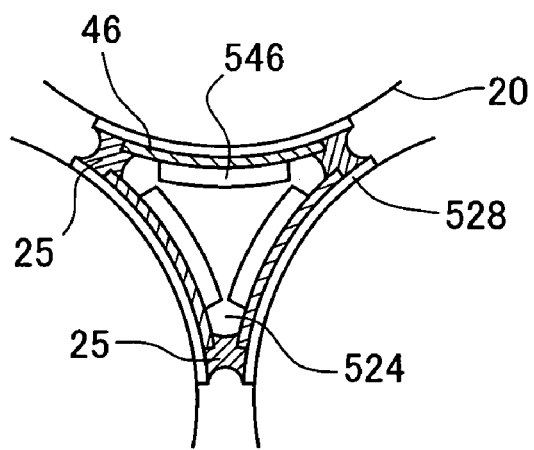

FIG. 11 comprises explanatory drawings of the construction of a coolant path in a hydrogen storage apparatus of a third embodiment. Because the hydrogen storage apparatus of the third embodiment has a construction similar to that of the hydrogen storage apparatus 10 of the first embodiment, only the different components will be described. Furthermore, the identical reference numbers will be used in FIG. 11 to indicate common components with the first embodiment. FIG. 11(A) is a perspective drawing showing the construction of a heat transfer plate 528 that is used by the hydrogen storage apparatus of the third embodiment in place of the heat transfer plate 28 of the first embodiment. FIG. 11(B) is an explanatory drawing showing a cross-sectional view of the coolant path 524 formed between three hydrogen storage tanks 20 of the hydrogen storage apparatus of the third embodiment.

Each heat transfer plate 528 of the hydrogen storage apparatus of the third embodiment includes a barrier plate 46 on the coolant path side surface thereof (see FIG. 11(A)). Each barrier plate 46 is a roughly rectangular thin plate having a shorter width and length than the heat transfer plate 528 and is curved along the contour of the heat transfer plate 528 to enable it to adhere to the surface thereof. The barrier plate 46, like the heat transfer plate 528, is formed from a metal material such as aluminum alloy or stainless steel. Furthermore, by making three-sided rectangular cuts in the barrier plate 46 at a prescribed distance from each other and bending outward the cut-out sections of the barrier plate 46 in a roughly perpendicular direction relative to the surface of the barrier plate 46, barrier plate members 546 are formed.

In the third embodiment, coolant paths 524 are formed using heat transfer plates 528 over which are affixed barrier plates 46 in which are formed multiple barrier plate members 546, and as shown in FIG. 11(B), the barrier plate members 546 reduce the cross-sectional area of the coolant path 524 available for coolant flow, thereby disrupting the flow of coolant.

According to the hydrogen storage apparatus of the third embodiment, because the cross-sectional flow area of the coolant path 524 is reduced by the barrier plate members 546, the efficiency of heat exchange between the coolant and the coolant path wall surfaces (i.e., the heat transfer plates 528) can be increased via the speeding up of the coolant flow within the coolant path 524. In other words, because the barrier plate members 546 operate as flow constrictors in the same manner as the barrier rod in the second embodiment, the coolant can perform cooling and heating more efficiently and the same effect obtained using the second embodiment can be obtained via the third embodiment. Furthermore, according to the third embodiment, by forming the barrier plate members 546 on the heat transfer plates 528, the laminar flow of the coolant is disrupted and the coolant becomes agitated, thereby further increasing heat exchange efficiency. Moreover, because the barrier plate 46 of the third embodiment is made of a metal material, by bringing the coolant into contact with the barrier plate members 546, heat transfer between the coolant and the coolant path wall surfaces can be accelerated and the efficiency of heat exchange between the coolant and the hydrogen storage tanks 20 can be increased.

The barrier plate members of the barrier plate disposed on the heat transfer plate may have a configuration different from the barrier plate members 546 shown in FIG. 11. The effect [achieved by the present invention] can also be obtained by using heat transfer plates having a surface in which are formed protrusions that reduce the cross-sectional flow area and obstruct coolant flow, rather than the substantially flat, plate-like heat transfer plates used to form the coolant paths in the previous embodiments.

E. FOURTH EMBODIMENT

Figure 12:
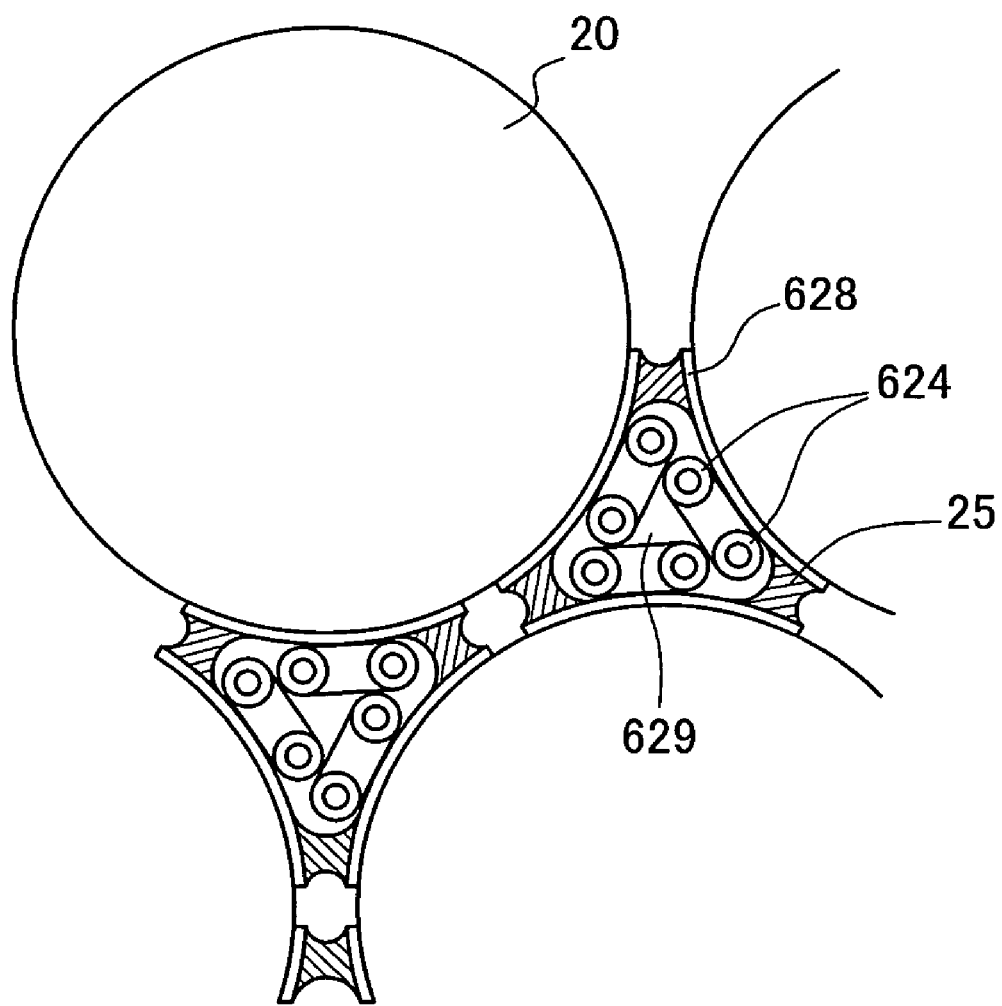
FIG. 12 is an explanatory drawing showing a horizontal cross-sectional view of coolant flow paths of the hydrogen storage apparatus of a fourth embodiment.

FIG. 12 is an explanatory drawing showing a horizontal cross-sectional view of coolant paths of a hydrogen storage apparatus of a fourth embodiment. Because the hydrogen storage apparatus of the fourth embodiment has a construction similar to that of the hydrogen storage apparatus 10 of the first embodiment, identical reference numbers will be used in FIG. 12 to indicate common components with the first embodiment. Furthermore, because the interior construction of the coolant path formed between the hydrogen storage tanks 20 in the hydrogen storage apparatus of the fourth embodiment differs from the equivalent construction in the first embodiment, FIG. 12 focuses on the construction of such coolant path.

In the hydrogen storage apparatus of the fourth embodiment, while a coolant path is formed in the empty space formed between three hydrogen storage tanks 20 as in the above embodiments, rather than a single coolant path occupying the entire empty space, three coolant paths occupy the empty space. In other words, three coolant pipes 624 are disposed in each empty space 629 surrounded by three hydrogen storage tanks 20.

In the fourth embodiment, heat transfer plates 628 are used instead of the heat transfer plates 28 of the first embodiment. A coolant pipe 624 is fixed to the surface of each heat transfer plate 628. The coolant pipe 624 is roughly U-shaped, and the straight sections thereof are fixed to the heat transfer plate 628 such that they run longitudinally parallel to the hydrogen storage tanks 20. Because FIG. 12 is a horizontal cross-sectional view of the empty space 629, the U-shaped coolant pipe 624 is represented therein as two cross-sectional flow path areas. When coolant is introduced into one of the openings in the coolant pipe 624 disposed at one end of the adjacent hydrogen storage tank 20, the coolant flows inside the coolant pipe 624 in the longitudinally parallel direction described above, the direction of flow is reversed at the other end of the adjacent hydrogen storage tank 20, and the coolant is finally discharged from the other opening disposed at the first end of the adjacent hydrogen storage tank 20. A roughly triangular prism-shaped empty space 629 is surrounded by three heat transfer plates 628 that each include a U-shaped coolant pipe 624. The coolant pipe 624 is made of a metal material such as aluminum alloy or stainless steel. Because the coolant pipe 624 and its corresponding heat transfer plate 628 are fixed to each other via brazing, for example, the coolant in the coolant pipe 624 is thermally connected to the heat transfer plate 628 that includes the coolant pipe 624 and the adjacent hydrogen storage tank 20.

According to the hydrogen storage apparatus pertaining to the fourth embodiment having the above construction, because coolant pipes 624 are disposed in the roughly triangular prism-shaped empty spaces 629 formed between the hydrogen storage tanks 20, the cross-sectional flow area of each coolant path is smaller than the area available when the entire empty space is used as a coolant path. Therefore, coolant flows through each coolant pipe 624 more rapidly, and the efficiency of heat exchange between the coolant and the hydrogen storage tank 20 is increased. Here, because a coolant pipe 624 is affixed to each heat transfer plate 628, which in turn is in contact with its own hydrogen storage tank 20, the hydrogen storage tanks 20 as a whole can be cooled and heated at a uniform rate.

Moreover, because each coolant pipe 624 in the fourth embodiment is U-shaped, in a hydrogen storage apparatus having a construction in which multiple hydrogen storage tanks 20 are bound together, the piping through which coolant is supplied and discharged can be installed at only one end of the hydrogen storage tanks 20. This simplifies the construction of the hydrogen storage apparatus and enables it to be assembled more easily. Furthermore, by using the same seal members used in the first through third embodiments in the fourth embodiment, the expansion and contraction of the hydrogen storage tanks 20 that accompanies the storage and discharge of hydrogen can be absorbed, thereby increasing the durability of the hydrogen storage apparatus as a whole.

F. FIFTH EMBODIMENT

Figure 13:
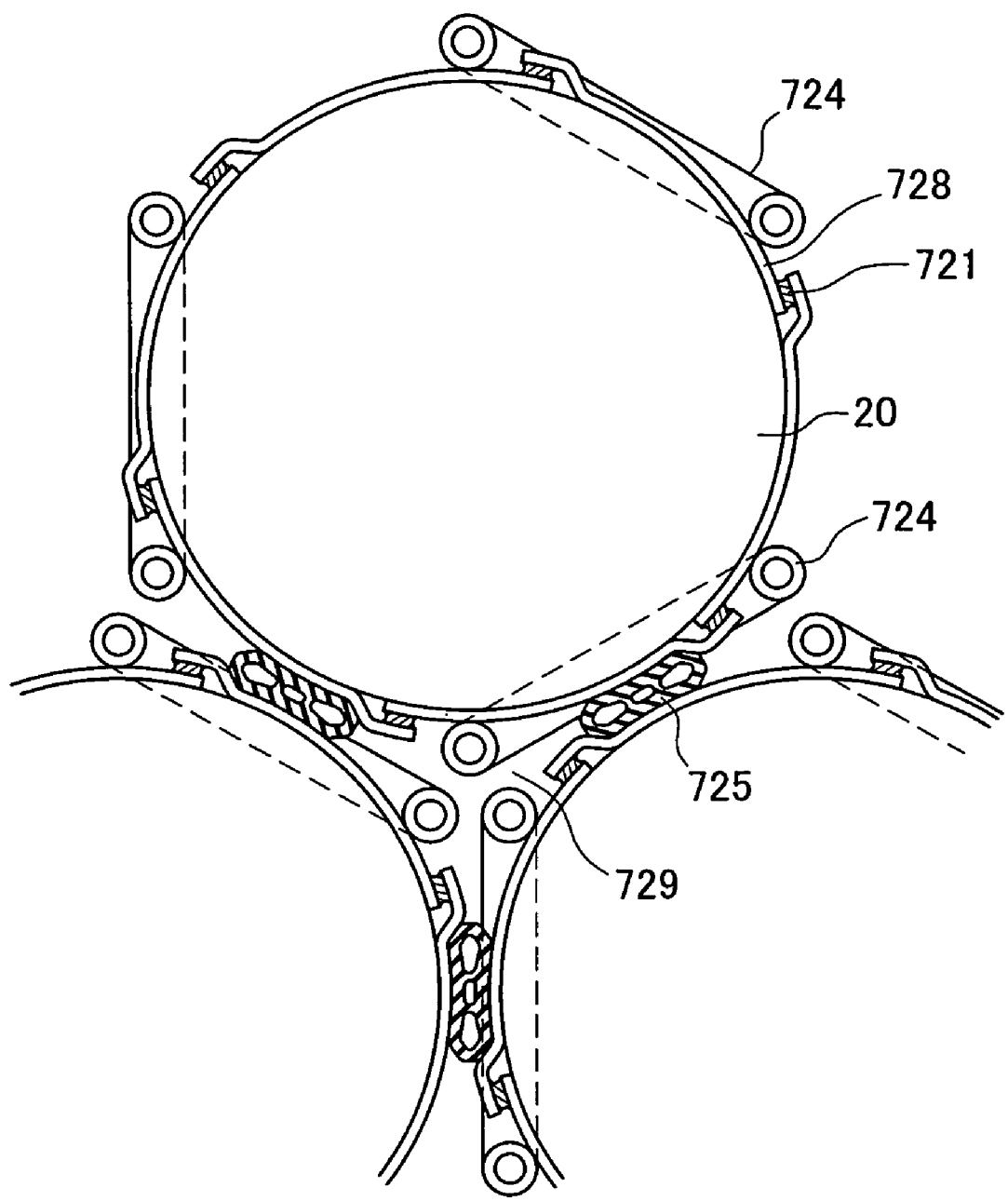
FIG. 13 is an explanatory drawing showing a horizontal cross-sectional view of a coolant flow path of the hydrogen storage apparatus of a fourth embodiment.

FIG. 13 is an explanatory drawing showing a horizontal cross-sectional view of a coolant path of a hydrogen storage apparatus of a fifth embodiment. Because the hydrogen storage apparatus of the fifth embodiment has a construction similar to that of the hydrogen storage apparatus 10 of the first embodiment, and only the interior construction of the coolant path formed between the hydrogen storage tanks 20 in the hydrogen storage apparatus of the fifth embodiment differs from the equivalent construction in the first embodiment, FIG. 13 focuses on the construction of such coolant path.

In the hydrogen storage apparatus of the fifth embodiment, coolant pipes are disposed in each roughly triangular prism-shaped empty space formed between three hydrogen storage tanks 20 as in the fourth embodiment. In other words, coolant pipes 724 are disposed in each empty space 729 surrounded by three hydrogen storage tanks 20.

Heat transfer plates 728 are used in the fifth embodiment instead of the heat transfer plates 28 of the first embodiment. In the fifth embodiment, the coolant pipes 724 are roughly U-shaped, and each coolant pipe 724 is fixed to the surfaces of two adjacent heat transfer plates 728. In other words, a given coolant pipe 724 is disposed such that the two straight portions that form the U-shaped configuration are each fixed to two different adjacent heat transfer plates 728 and run longitudinally parallel to the hydrogen storage tanks 20. Because six heat transfer plates 728 are disposed around the periphery of each hydrogen storage tank 20, each hydrogen storage tank 20 has three associated coolant paths 724. Because FIG. 13 is a horizontal cross-sectional view of an empty space 629, two flow path cross-sections are shown therein for each U-shaped coolant pipe 724. Furthermore, because each roughly triangular prism-shaped empty space 729 is surrounded by three heat transfer plates 728, each empty space 729 contains three straight sections of a U-shaped coolant pipe 724, each belonging to a different U-shaped coolant pipe 724. The coolant pipes 724 are made of a metal material such as aluminum alloy or stainless steel. Because each coolant pipe 724 is fixed to its corresponding heat transfer plates via brazing or the like, the coolant in the coolant pipe 724 is thermally connected to the heat transfer plates 728 to which the coolant pipe 724 is connected and the adjacent hydrogen storage tank 20.

An adhesion member 721 is disposed in each area of overlap where one of the six heat transfer plates 728 that together cover a hydrogen storage tank 20 comes into contact with an adjoining heat transfer plate 728. This adhesion member is made of a synthetic rubber adhesive that affixes adjoining heat transfer plates 728 to each other. Furthermore, in the hydrogen storage apparatus of the fifth embodiment, a spacer 725 comprising an elastic material such as rubber or the like is disposed between adjacent heat transfer plates in the areas where hydrogen storage tanks 20 are contacting each other.

According to the hydrogen storage apparatus pertaining to the fifth embodiment having the above construction, because U-shaped coolant pipes 724 are disposed in each roughly triangular prism-shaped empty space 729 formed between hydrogen storage tanks 20, the same effect as that achieved via the fourth embodiment may be attained. Furthermore, because spacers 725 comprising an elastic material that operate as buffer members are disposed in the areas where heat transfer plates 728 are contacting each other in the hydrogen storage apparatus of the fifth embodiment, the expansion and contraction of the hydrogen storage tanks 20 that accompanies the storage and discharge of hydrogen can be absorbed and the overall durability of the hydrogen storage apparatus can be increased.

Figure 14A:
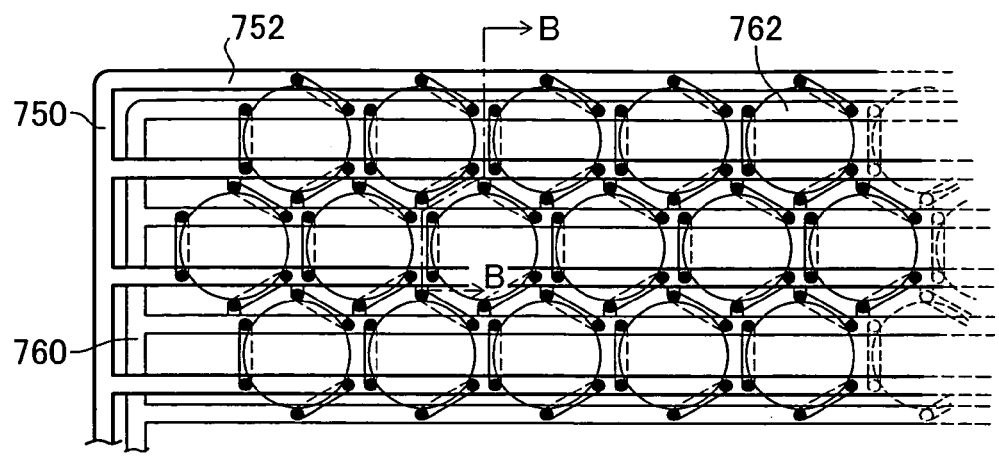
FIG. 14 comprises explanatory drawings showing an example of the arrangement of pipes used for the supply and discharge of coolant.
Figure 14B:
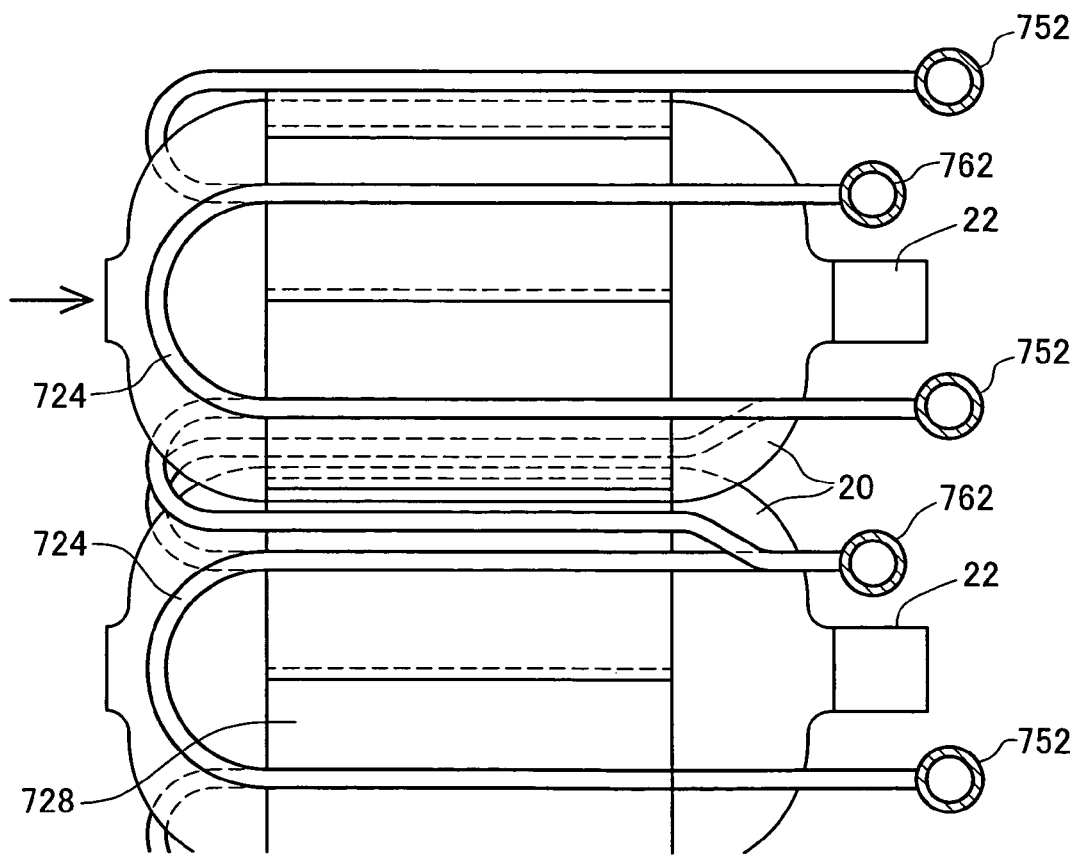

The use of U-shaped coolant pipes 724 as described in connection with the hydrogen storage apparatus pertaining to the fifth embodiment enables the pipes that perform supply and discharge of coolant to the hydrogen storage tanks 20 to be disposed at a single end of the hydrogen storage apparatus comprising multiple bundled-together hydrogen storage tanks 20. FIG. 14 comprises explanatory drawings showing an example of the arrangement of the coolant supply and discharge pipes in the hydrogen storage apparatus of the fifth embodiment described above. FIG. 14(A) is an explanatory drawing showing the multiple hydrogen storage tanks 20 disposed in a three-dimensional fashion and the coolant paths connected thereto from a perspective perpendicular to the length of the hydrogen storage tanks 20. FIG. 14(B) is an explanatory drawing of the hydrogen storage apparatus shown in FIG. 14(A) cut along the line B—B therein.

As shown in FIG. 14(A), the hydrogen storage apparatus includes a main coolant supply path 750 for supplying coolant to each coolant pipe 724 and multiple coolant supply branches 752 that branch off from the main coolant supply path 750 and connect to individual coolant pipes 724. The hydrogen storage apparatus also includes a main coolant discharge path 760 that collects the coolant discharged from the various coolant pipes 724 and multiple coolant discharge branches 762 that are connected to the individual coolant pipes 724 and extend back to the main coolant discharge path 760. The connections between the main coolant path and the branches, as well as between the branches and the coolant path units 724, are made via brazing. While three U-shaped pipes 724 are disposed around each hydrogen storage tank 20, one end of each such pipe 724 is connected to one of the coolant supply branches 752, while the other end is connected to one of the coolant discharge branches 762. Because the hydrogen storage tanks 20 are arranged in an ordered three-dimensional fashion as shown in FIG. 14, the coolant pipes 724 disposed at appropriate positions on the hydrogen storage tanks 20 belonging to the same row in FIG. 14, as well as the ends thereof, are positioned at substantially the same height. Consequently, by aligning the coolant supply branches 752 and coolant discharge branches 762 horizontally and positioning them at a prescribed height, the ends of the coolant pipes 724 positioned so as to correspond to a given row of multiple hydrogen storage tanks 20 can be connected to the same coolant supply branch 752 or coolant discharge branch 762.

Using the above construction, by inserting the hydrogen storage tanks 20 in the direction indicated by the arrow in FIG. 14(B) after the coolant supply/discharge piping is assembled, the hydrogen storage apparatus can be built easily. When the ends of the U-shaped coolant pipes 724 are fixed to a piping assembly comprising coolant supply branches 752 and coolant discharge branches 762, the curved ends of the coolant pipes 724 are not fixed and are easily adjusted. Therefore, even where a hydrogen storage apparatus in which the hydrogen storage tanks 20 and the coolant pipes 724 are extremely close together is assembled, as shown in FIG. 14(A), the hydrogen storage tanks 20 can be inserted by adjusting the positions of the coolant pipes 724, whereby the hydrogen storage apparatus can be easily assembled.

G. OTHER EMBODIMENTS

The present invention is not limited to the embodiments and examples described above, and may be implemented in various forms within the essential scope thereof, such as via the following variations, for example.

(1) While the hydrogen storage apparatuses according to the first through fifth embodiments included hydrogen storage tanks 20 having the cross-sectional configuration shown in FIG. 3, the hydrogen storage apparatus of the present invention may include hydrogen storage tanks having a different configuration or construction. For example, so long as there is sufficient heat transfer between the hydrogen-storing alloy and the tank container 30, the fin 32 may be omitted. Alternatively, the tank container 30 may comprise a metal other than aluminum alloy, such as stainless steel. Furthermore, while the presence of a reinforcing layer 34 as described in the embodiments is preferred because it enables high-pressure gas to be stored and enables more heat generated during gas occlusion to be absorbed by the increased heat capacity of the entire hydrogen storage tank 20, it is acceptable if such reinforcing layer 34 is not used. In either case, by ensuring sufficient heat transfer between the coolant in the coolant path disposed outside the hydrogen storage tank 20 that houses the hydrogen-storing alloy and the hydrogen-storing alloy inside the tank, the same effect described above brought about by disposing the coolant path in the roughly triangular prism-shaped empty space formed between tanks can be achieved.

(2) In the first through fifth embodiments, a hydrogen-storing alloy filled the tank container 30, but a different type of storing/adsorbing material may be used. Alternatively, a different type of storing/adsorbing material may be included together with hydrogen-storing alloy. For example, activated charcoal or carbon nanotubes may be added to hydrogen-storing alloy.

(3) While hydrogen storage tanks that stored hydrogen were described in the above embodiments, the present invention may be applied and the same effect achieved using tanks that store a type of high-pressure gas other than hydrogen.

What is claimed is:

1. A gas storage apparatus for storing gas, said gas storage apparatus comprising:
    multiple roughly cylindrical gas storage tanks that are disposed in an ordered fashion such that roughly triangular prism-shaped empty spaces are formed between parallel adjacent tanks;
    roughly triangular prism-shaped coolant path units through which coolant flows, said coolant path units disposed in said empty spaces such that they come into contact with said gas storage tanks along the outer surfaces thereof, wherein each said coolant path unit includes three metal heat transfer plates that form three side surfaces of each said coolant path unit and cover part of the outer walls of said gas storage tanks.

2. A gas storage apparatus according to claim 1, wherein each said multiple gas storage tank houses a storing/adsorbing material that stores and/or adsorbs said gas.

3. A gas storage apparatus according to claim 2, wherein each said coolant path unit further includes buffer members that are formed from an elastic material and are disposed between adjacent heat transfer plates.

4. A gas storage apparatus according to claim 3, wherein the entire interior of each said coolant path unit that is surrounded by the three said heat transfer plates forms a coolant path in which coolant flows.

5. A gas storage apparatus according to claim 4, wherein each said coolant path unit includes a flow constrictor that reduces the cross-sectional area of said coolant path therein.

6. A gas storage apparatus according to claim 5, wherein said flow constrictor includes a rod-shaped main unit that runs parallel to said coolant path unit, and gripping members that are formed from an elastic material and are disposed such that they come into contact with said main unit and the interior walls of said coolant path unit.

7. A .gas storage apparatus according to claim 5, wherein said flow constrictor includes protrusions formed on the surface. of said each heat transfer plate that forms an interior wall of said coolant path unit.

8. A gas storage apparatus according to claim 7, wherein said protrusions are configured on the surface of said each heat transfer plate so as to obstruct the flow of said coolant.

9. A gas storage apparatus according to claim 3 further comprising:
    outer wall heat transfer acceleration units that are disposed in the gaps formed between the outer walls of said gas storage tanks and said heat transfer plates, and accelerate heat transfer between the gas storage tank outer walls and the heat transfer plates.

10. A gas storage apparatus according to claim 9, wherein said outer wall heat transfer acceleration units are formed using a gel-like substance.

11. A gas storage apparatus according to claim 3, wherein coolant pipes in which coolant flows are disposed inside each said coolant path unit in contact with said heat transfer plates.

12. A gas storage apparatus according to claim 11, wherein each said coolant pipe disposed in the multiple said coolant path units is U-shaped and includes two substantially linear sections that run longitudinally parallel to said heat transfer plates and a curved section disposed at a specified longitudinal end thereof.

13. A gas storage apparatus according to claim 1, wherein said gas storage tanks are tanks that store hydrogen gas, each comprising a container formed of a metal including aluminum that houses said storing/adsorbing material, and said storing/adsorbing material includes a hydrogen storing alloy.

14. A gas storage apparatus that stores gas, said gas storage apparatus comprising:
    multiple roughly cylindrical gas storage tanks that each contain a storing/adsorbing material that stores and/or adsorbs said gas;
    roughly triangular prism-shaped coolant paths that are formed between said gas storage tanks that are disposed parallel to each other;
    roughly triangular prism-shaped coolant path units through which coolant flows, said coolant path units disposed in said coolant paths such that at least a portion of said coolant path units come into contact with said gas storage tanks along the outer surface thereof,
    wherein each said coolant path unit includes three metal heat transfer plates that form three side surfaces of each said coolant path unit, and at least a portion of each metal heat transfer plate providing the contact with a part of an outer wall of an opposing gas storage tank.

15. A gas storage apparatus according to claim 14, wherein said gas storage tanks are tanks that store hydrogen gas, each comprising a container formed of a metal including aluminum that houses said storing/adsorbing material, and said storing/adsorbing material includes a hydrogen storing alloy.

16. A gas storage apparatus that that stores gas, said gas storage apparatus comprising:
    multiple roughly cylindrical gas storage tanks that each contain a storing/adsorbing material that stores and/or adsorbs said gas and are disposed in an ordered fashion such that they are parallel to each other; and
    multiple U-shaped coolant pipes that each include two substantially linear sections that run longitudinally parallel to said gas storage tanks and a curved section disposed at a specified longitudinal end thereof, and are disposed such that they are in contact with the surfaces of said gas storage tanks in the empty spaces formed between multiple said gas storage tanks.

17. A gas storage apparatus according to claim 16, wherein said gas storage tanks are tanks that store hydrogen gas, each comprising a container formed of a metal including aluminum that houses said storing/adsorbing material, and said storing/adsorbing material includes a hydrogen storing alloy.

* * * * *